(12) United States Patent  
Seitz et al.

(10) Patent No.: US 9,268,124 B2
(45) Date of Patent: Feb. 23, 2016

(54) MICROSCOPE AND METHOD FOR CHARACTERIZING STRUCTURES ON AN OBJECT

(71) Applicants: Carl Zeiss SMS GmbH, Jena (DE); Carl Zeiss AG, Oberkochen (DE)

(72) Inventors: Holger Seitz, Jena (DE); Thomas Frank, Saalfeld (DE); Thomas Trautzsch, Jena (DE); Norbert Kerwien, Moegglingen (DE)

(73) Assignees: Carl Zeiss SMS GmbH, Jena (DE); Carl Zeiss AG, Oberkochen (DE)

( * ) Notice: Subject to any disclaimer, the term of this patent is extended or adjusted under 35 U.S.C. 154(b) by 442 days.

(21) Appl. No.: 13/908,192

(22) Filed: Jun. 3, 2013

(65) Prior Publication Data

US 2013/0321609 A1    Dec. 5, 2013

Related U.S. Application Data

(60) Provisional application No. 61/655,284, filed on Jun. 4, 2012.

(30) Foreign Application Priority Data

Jun. 4, 2012 (DE) .......................... 10 2012 011 315

(51) Int. Cl.
*G02B 21/16* (2006.01)
*G02B 21/00* (2006.01)
*G02B 21/36* (2006.01)
*G02B 21/06* (2006.01)

(52) U.S. Cl.
CPC ............ *G02B 21/0016* (2013.01); *G02B 21/06* (2013.01); *G02B 21/361* (2013.01); *G02B 21/364* (2013.01); *G02B 21/365* (2013.01)

(58) Field of Classification Search
None
See application file for complete search history.

(56) References Cited

U.S. PATENT DOCUMENTS

2008/0174784 A1\* 7/2008 Colonna De Lega et al. ............................ 356/511
2012/0075456 A1   3/2012 Seitz

FOREIGN PATENT DOCUMENTS

| DE | 10 2010 047 050 | 3/2012 | ................ G03F 1/00 |
| DE | 10 2011 121 532 | 6/2012 | ................ G03F 1/72 |
| EP | 2 171 539 | 4/2010 | ................ G03F 7/20 |
| WO | WO 2009/007977 | 1/2009 | |
| WO | WO 2012/084142 | 6/2012 | ................ G03F 1/00 |

\* cited by examiner

*Primary Examiner* — Dave Czekaj
*Assistant Examiner* — Nam Pham
(74) *Attorney, Agent, or Firm* — Fish & Richardson P.C.

(57) ABSTRACT

A microscope includes an illumination unit for illuminating a mask at a predetermined non-axial illumination angle, an imaging unit for imaging an aerial image of the mask within a predetermined defocus region, and an imaging field stop, in which as a result of the lateral displacement of the aerial image depending on the position within the defocus region and on the non-axial illumination angle, the opening of the imaging field stop is dimensioned such that the aerial image is either completely encompassed or circumferentially cut within the defocus region.

A method for characterizing a mask having a structure includes illuminating the mask at at least one illumination angle using monochromatic illumination radiation such that a diffraction image of the structure is created, recording the diffraction image, establishing the intensities of the maxima of the adjacent orders of diffraction, and establishing an intensity ratio of the intensities.

18 Claims, 6 Drawing Sheets

MICROSCOPE AND METHOD FOR CHARACTERIZING STRUCTURES ON AN OBJECT

CROSS-REFERENCE TO RELATED APPLICATIONS

Under 35 U.S.C. §119, this application claims priority to German Patent Application DE 10 2012 011 315.3, filed on Jun. 4, 2012, and U.S. Provisional Patent Application 61/655,284, filed on Jun. 4, 2012. The contents of the above applications are hereby incorporated by reference in their entirety.

BACKGROUND

This patent document relates to a microscope and a method for characterizing structures on an object.

The patent document moreover relates to a mask inspection microscope and a method for characterizing structures on a mask.

Numerous measurement methods are used in the production of semiconductor components in order to monitor the results of the individual steps of the lithographic process. A basic object in this case lies in the measurement of dimensions or shapes of the structures to be produced.

In order to monitor the quality of a process step, it is advantageous to monitor the smallest structures that can still be produced. These are referred to as critical dimensions, abbreviated as CD. The critical dimension of a mask usually relates to the line width of a structure alternately consisting of lines and spaces. During the lithographic process, this structure is initially produced on a mask (photomask, reticle), for example by means of chromium on quartz glass. Further masks are also known, for example phase shift masks (PSM) or reflective masks, which are particularly used in the case of illumination radiation with short wavelengths in the EUV range. As a result of exposure in a scanner, this structure is produced on a wafer coated with a photoresist. The desired structure is obtained on the wafer by subsequent development and etching.

The characterization of a structure, such as e.g. the measurement of the CD or the line width of a structure, can be carried out both on the mask and on the wafer. On the one hand, the measurement on the wafer is very significant since the end product is measured; on the other hand, it is very complicated since the complete process of wafer exposure needs to be carried out for testing purposes.

If a structure of a mask is characterized on the mask itself, errors as a result of the behavior of the mask during the imaging and as a result of further method steps are not incorporated into the measurement. Errors on the mask are, in general, increased during the imaging by the scanner. A further problem is that mask structures are known, which are optimized by resolution enhancement technology (RET) and therefore do not completely correspond to the structures to be imaged. This renders more difficult a measurement of the CD on the mask.

By way of example, scanning electron microscopy is used to measure the CD on both the masks and the wafers (CD-SEM, critical dimension scanning electron microscopy).

A further option for characterizing masks lies in the evaluation of the aerial images of masks using a mask inspection microscope. In this method, the aerial image largely exhibits the features that are also imaged on the wafer. The mask inspection microscope largely simulates the imaging property of a scanner.

A further option for characterizing masks and wafers is provided by non-imaging optical methods. Here, use is made of various related measurement methods, such as e.g. classical scatterometry, ellipsometry, diffractometry or reflectometry, which are known by the overarching term scatterometry. Masks can also be characterized by measuring the transmission of masks. This method can also be used to establish the CD of a structure, as disclosed in EP 2171539 A1, for example.

The microscopes and methods discussed here are also suitable for examining objects other than masks.

SUMMARY

This disclosure provides a fast and cost-effective method having high measurement accuracy, and a microscope for characterizing a structure on an object, more particularly on a mask.

According to the invention, a microscope includes an illumination unit for illuminating an object at a predetermined non-axial illumination angle ($\Theta$), an imaging unit for imaging an aerial image of the object in a plane within a predetermined defocus region extending in the direction of the optical axis of the microscope, and an imaging field stop, in which as a result of the lateral displacement of the aerial image depending on the position within the defocus region and on the non-axial illumination angle, the opening of the imaging field stop is dimensioned such that the aerial image is either completely encompassed or circumferentially cut within the defocus region.

The microscope is preferably embodied as a mask inspection microscope. The object is preferably a mask. The imaging unit can be embodied as an objective with a tube lens.

What this measure achieves is that a defined region of an object, more particularly of a mask, can be examined while avoiding stray light. Falsification of the result as a result of the lateral displacement is avoided in the process. As a result, it is possible to measure a mask at different points without having to refocus in the case of each measurement.

In one variant, the aerial image is not cut at all by the opening of the imaging field stop and, in a further variant, it is always cut circumferentially, i.e. from all sides. What this achieves is that the overall intensity of aerial images is independent of the position thereof within the defocus region. This is advantageous when evaluating intensities of aerial images, such as e.g. within the scope of evaluating the overall intensity of aerial images for characterizing objects or masks, as described in e.g. DE102010047050A1. Here, all intensities of a recorded aerial image are added in order to calculate an overall intensity. This measure is also advantageous when recording diffraction images of an object or of a mask, as described in the following text.

The image plane of the imaging unit, i.e. the plane in which the mask is imaged during focusing, preferably lies within the defocus region. Starting from the image plane, the defocus region can extend by a value $+\Delta z$ or $-\Delta z$ in both directions along the optical axis.

In a further embodiment of the invention, the imaging field stop is arranged in the image plane of the imaging unit.

In a further embodiment of the invention, the microscope has an illumination field stop predetermining the size of an illumination field on the object.

In particular, this measure is advantageous if the aerial image is completely encompassed by the imaging field stop within the defocus region.

In a further embodiment of the invention, the illumination field stop and the imaging field stop have a square design, wherein the following applies to the difference in the edge length of the imaging field stop F_abb_mask and the edge length of the illumination field stop F_bel_mask: |F_abb_mask−F_bel_mask|>=2*tan(Θ), wherein the measurements are related to the dimensions of these stops on the object.

An advantage of this measure is that illumination and imaging field stops are provided which, on the one hand, enable maximum stop down of the stray light, wherein, on the other hand, the overall intensity of the aerial image or of a diffraction image within the defocus region however remains constant.

A further advantage is that the stops can be used for all azimuth angles of the illumination radiation.

In a further embodiment of the invention, the measurements of the illumination field stop and of the imaging field stop are designed in such a way that an aerial image of an object within the defocus region only includes one structure type.

In a further embodiment of the invention, the microscope includes: a Bertrand optical unit and a detector, wherein the Bertrand optical unit is inserted into the beam path of the microscope for recording a diffraction image of the object.

An advantage of this measure is that the microscope can be used for recording and evaluating diffraction images. Evaluation methods are discussed in the following text.

In a further embodiment of the invention, the illumination field on the object has a main region and an edge region, wherein the edge region surrounds the main region, wherein the intensity of the illumination radiation is constant within the main region and continuously decreases in the edge region.

In a further embodiment of the invention, the reduction in the intensity in the edge region corresponds to a Gaussian function.

In a further embodiment of the invention, the intensity profile of the illumination field is adapted by defocusing the illumination field stop.

In a further embodiment of the invention, the microscope has a stop which is arranged in a pupil plane of an illumination beam path, by means of which the illumination angle is predetermined.

In a further embodiment of the invention, the stop is embodied as a monopole, wherein the position of the pole is adapted to the alignment of the grating period of a structure on the mask.

In a further embodiment of the invention, the stop is embodied as an asymmetric dipole, wherein the positions of the two poles are adapted to the alignments of the grating periods of different structures on the mask.

In a further embodiment of the invention, the microscope includes: at least one polarizer, which can be introduced into the illumination beam path.

Polarized illumination radiation is often used during the exposure of wafers in lithography. This results in an increased contrast of the image of the structures on the wafers. Hence, an advantage of this measure is that it is possible to simulate the imaging behavior of a scanner, as is used in lithography.

The invention furthermore includes a method for characterizing an object having a structure, including illuminating the object at at least one predetermined non-axial illumination angle (Θ) using illumination radiation such that an aerial image of the structure is created in a plane within a predetermined defocus region which extends in the direction of the beam path of the microscope, and predetermining an imaging field stop, wherein the opening of the imaging field stop is dimensioned such that the aerial image are either completely encompassed or circumferentially cut.

The advantages of this method are explained in the text relating to the above-described microscope.

In a further embodiment of the invention, the illumination radiation on the object generates an illumination field and a diffraction image of the structure is created, said diffraction image including at least two maxima of adjacent orders of diffraction.

The invention furthermore includes a method for characterizing an object, more particularly a mask, having a structure, the method including illuminating the object at at least one illumination angle using monochromatic illumination radiation such that a diffraction image of the structure is created, said diffraction image including at least two maxima of adjacent orders of diffraction, recording the diffraction image, establishing the intensities of the maxima of the adjacent orders of diffraction, and establishing an intensity ratio of the intensities.

This measure renders it possible to establish a precise measurement variable quickly for characterizing the structure of an object. Since the ratio of the maxima of adjacent orders of diffraction is calculated, this measurement method is not, or only to a small extent, influenced by variations in the intensity of the illumination.

Compared to characterizing structures on objects or masks from aerial images of the structures of masks, it is much easier to establish the intensities of the maxima of the orders of diffraction from the recorded diffraction images. This saves calculation time of a utilized data processing apparatus during the image evaluation.

A further advantage over the evaluation of aerial images is that the characterization takes place averaged over the examined section.

However, if different diffraction maxima of various structures occur in the examined region, the evaluation can easily be restricted to the two relevant diffraction maxima. The relevant orders of diffraction can easily be detected by the image processing unit.

These methods and all further embodiments are combinable with the first-mentioned method and with the microscope.

In a further embodiment of the invention, the diffraction image is completely imaged on a single detector for recording purposes.

An advantage of this measure is that a complete diffraction image is quickly obtained. There is no need for a lateral movement of the detector.

An advantage over recording and evaluating aerial images is that the recording of diffraction images is substantially more tolerant against defocusing of the diffraction image. Diffraction images can be recorded within a defocus region. This renders it possible to carry out a number of measurements at different positions of an object or of a mask, without focusing being required between the individual measurements. This significantly increases the speed of characterizing a mask.

In a further embodiment of the invention, the diffraction image is recorded during a continuous relative motion between object or mask and detector.

In one variant of the measure, the continuous relative movement is brought about by the movement of the mask. In a further variant of the measure, the mask lies on a mask holder which enables continuous relative motion. By way of example, the mask is moved in a plane parallel to the plane of the detector.

In one variant of this measure, the movement speed and the exposure time of the detector are predetermined in such a way that each region of the area to be examined contributes to the same extent to the obtained diffraction image.

An advantage of this measure is that fast characterization of a complete mask or of large continuous portions of a mask is possible. Scanning masks by recording aerial images of the mask structure is significantly more complicated. For this, individual aerial images of the mask structure must be recorded in sections. However, this only permits a very short exposure time or a low scan speed. Alternatively, it is also possible for use to be made of complicated detectors, which permit a time-delayed integration of the signals. Use is made of so-called TDI (time-delayed integration) detectors. In these methods, charges of the detector are displaced synchronously with the scan movement in order thus to achieve long exposure times.

In a further embodiment of the invention, a line width of the structure is established from at least one correlation between at least one established intensity ratio of a structure and a known line width of this structure.

An advantage of this measure is that absolute values become accessible in a simple manner. The calibration can take place with respect to measurements of the structure on the object or on the mask, or on the exposed wafer or with respect to an aerial image of the mask.

In a further embodiment of the invention, the illumination radiation generates an illumination field on the object, said illumination field having a main region and an edge region, wherein the edge region surrounds the main region, wherein the intensity of the illumination radiation is constant within the main region and continuously decreases in the edge region.

An advantage of this measure is that the dependence of the established intensity ratio on changes in the position of the structure to be characterized in the illumination field is reduced.

Mask inspection microscopes known from the prior art use an illumination field which has a constant intensity profile over the whole region, wherein the intensity more or less abruptly drops to zero at the edge of the illumination field. Such intensity profiles are also referred to as a "top hat profile".

A disadvantage when using these intensity profiles is that the established intensity ratios of a structure can depend on the position of this structure within the illumination field. By way of example, in the case of a structure embodied as "lines and spaces", as mentioned at the outset, the portion of the structure contributing to diffracting the illumination radiation may vary within the illumination field. This variation would, from the position of the structure within the illumination field, occur along the grating period of the structure. The variation leads to a change in the established intensity ratio. This leads to problems when comparing identical structure types, in which identical intensity ratios are expected. The reproducibility of the positioning of structures within the illumination field is limited. Errors during positioning can, for the aforementioned reasons, lead to errors in the intensity ratios to be established.

In a further embodiment of the invention, the reduction in the intensity in the edge region corresponds to a Gaussian function.

An advantage of this measure is that the dependence of the intensity ratios on changes in the position of the structure in the illumination field is particularly small.

In a further embodiment of the invention, the illumination field on the object is predetermined by an illumination field stop and the intensity profile of the illumination field is adapted by defocusing the illumination field stop.

An advantage of this measure is that a desired intensity profile of the illumination field can easily be predetermined. The intensity profile obtained by defocusing the illumination field stop corresponds to the one from the aforementioned measure, in which the intensity of the illumination radiation is constant within the main region of the illumination field and decreases in the edge region in a Gaussian fashion.

In a further embodiment of the invention, the at least one illumination angle is adapted to a grating period of the structure.

Here, the illumination angle is adapted in the direction of the normal of the surface of the object or of the mask—the Z-axis—and/or in the direction of the surface of the object or of the mask, i.e. the azimuth angle.

An advantage of this measure is that the diffraction maxima of the structures to be examined, to which the at least one illumination angle was adapted, are particularly pronounced in the diffraction image. What the adaptation of the illumination angles brings about is that the orders of diffraction to be evaluated are recorded with the greatest possible intensity or with high contrast, largely without bothersome influences from other structures. This enables a simple and precise evaluation of the diffraction image.

In a further embodiment of the invention, the at least one illumination angle is adapted to an alignment of the grating period of the structure on the object or on the mask.

In the case of this measure, the illumination angle is adapted in the direction to the surface of the object or of the mask—the azimuth angle of the illumination radiation. The surface of the object or of the mask is described by a rectangular coordinate system with X-axis and Y-axis. By way of example, structures with grating periods extending in the X- or Y-directions can be arranged on masks. By way of example, these structures are embodied as lines and spaces. If the grating period of a structure on a mask extends in the direction of the X-axis, the structure is referred to as an X-structure. If the grating period extends in the direction of the Y-axis, the structure is referred to as a Y-structure. The azimuth angle of the illumination radiation is 0° in the case of X-structures and 90° in the case of Y-structures.

The comparison of the intensity ratios of different positions of a mask is particularly meaningful for characterization purposes provided that measurement of comparable structures, i.e. structures with the same intended values for the grating period and line width, are compared to one another. Thus, X- and Y-structures with the same grating period and line width are an example of comparable structures.

An advantage of this measure is that, as a result of adapting the illumination angle to the structures, the diffraction maxima of comparable structures are imaged with the highest possible contrast.

Since possible positions of the diffraction maxima within a recorded diffraction image are predetermined by the at least one adapted illumination angle, the evaluation is simplified further.

In a further embodiment of the invention, the structure on the object or on the mask is simultaneously illuminated at at least two illumination angles, wherein each of the illumination angles is adapted to the alignment of the grating period of different structures on the object or on the mask.

An advantage of this measure is that structures with at least two alignments can be recorded simultaneously. By way of example, in this case the already mentioned X-structures and Y-structures, which are present on masks, can be examined together. Hence, it is possible to avoid a change in the illumination direction between measurements of X-structures or Y-structures.

In a further embodiment of the invention, the at least one illumination angle is predetermined by arranging a stop in a pupil plane of an illumination beam path of a microscope.

An advantage of this measure is that the illumination angles can be predetermined in a simple manner. The stops in a microscope can be interchanged easily and quickly. The design of the stop allows the realization of almost any distribution of illumination angles.

A further advantage of this measure is that an imaging method using a microscope can be used, alternating quickly with the recording of diffraction images. Thus, for example, it is possible to record and evaluate both the diffraction image and the aerial image of a structure on a mask.

In a further embodiment of the invention, the stop is embodied as annulus, which is adapted to the grating period of various structures on the object or the mask.

An advantage of this measure is that optimum illumination angles are predetermined for structures of a grating period or of a corresponding region, independently of the alignment of the grating period on the object or the mask.

In a further embodiment of the invention, the stop is embodied as a monopole, wherein the position of the pole is adapted to the alignment of the grating period of a structure on the object or the mask.

An advantage of this measure is that an optimum illumination angle is predetermined for structures of a grating period or of a corresponding region and a corresponding alignment of the grating period on the object or the mask. By way of example, the X-structures or Y-structures, already mentioned previously, can be examined individually in this case.

In a further embodiment of the invention, the stop is embodied as an asymmetric dipole, wherein the positions of the two poles are adapted to the alignments of the grating periods of different structures on the object or the mask.

An advantage of this measure is that simultaneous illumination of the structure of the object or of the mask at two illumination angles of an aforementioned exemplary embodiment can easily be realized.

In a further embodiment of the invention, the intensities of adjacent orders of diffraction are normalized to a reference value, more particularly to the intensity measured during the characterization of an object or of a mask without structure.

An advantage of this measure is that the normalized intensities of the maxima of the same orders of diffraction are comparable. This allows further characterization of the structure on the mask. By evaluating the normalized intensities of the diffraction maxima, it is possible to identify comparable structures within a diffraction image. Moreover, the comparison of the normalized intensities of the diffraction maxima in different diffraction images offers a criterion for establishing diffraction images of comparable structures.

In a further embodiment of the invention, the maxima of two adjacent orders of diffraction of a diffraction image are associated with a structure by applying at least one of the following criteria: position of the maxima of the orders of diffraction, spacing of the maxima of the orders of diffraction, intensities of the maxima of the orders of diffraction, extent of the maxima of the orders of diffraction.

An advantage of this measure is that further characterization of the structures is quickly and easily made possible from the diffraction images. By way of example, the association of the maxima of two adjacent orders of diffraction of a diffraction image with a structure is made possible. By way of example, "lines and spaces" with a specific grating period and line width can be identified.

In a further embodiment of the invention, a further characterization of the structure is brought about by comparing the recorded diffraction image to a simulated diffraction image.

The diffraction image of the structure to be characterized can be simulated provided that the design of the mask is known. Deviations between the structure on the mask and the structure predetermined by the design can be deduced from deviations between the recorded diffraction image and the simulated diffraction image.

An advantage of this measure is that the recorded diffraction image also allows a comparison with the predetermined structure of the mask.

In a further embodiment of the invention, a plurality of positions at which structures are characterized are predetermined on the object or the mask.

An advantage of this measure is that masks or objects can be characterized quickly.

In a further embodiment of the invention, a plurality of positions which are distributed uniformly over the area of the object or of the mask are predetermined.

An advantage of this measure is that objects or masks can be characterized, even if no or only incomplete information is available in respect of the structures. This embodiment is advantageous, particularly in conjunction with the aforementioned embodiments for finding comparable structures.

In a further embodiment of the invention, comparable structures are identified in the diffraction images by applying at least one of the following criteria: position of the maxima of the orders of diffraction, spacing of the maxima of the orders of diffraction, intensities of the maxima of the orders of diffraction, extent of the maxima of the orders of diffraction, differences to simulated diffraction images.

An advantage of this measure is that comparable structures are easily found.

In a further embodiment of the invention, positions are predetermined at which comparable structures are formed on the object or the mask.

An advantage of this measure is that comparable structures can be selected in a targeted fashion. Unnecessary measurements and the selection of diffraction images of comparable structures from a multiplicity of recorded images can be avoided. The positions can more particularly be predetermined by the mask design.

In a further embodiment of the invention, the mean value of the intensity ratios of all comparable structures and the percentage deviation of the individual intensity ratios from the mean value are calculated.

An advantage of this measure is that simple and meaningful appraisal of the mask is made possible. In the usually small deviations of the line widths from the intended values, the obtained values to a good approximation correspond to the deviations of the critical dimension (CD) from the intended value.

The invention moreover includes a microscope having a data processing apparatus which executes the steps as per the method according to the invention.

By way of example, the data processing apparatus is a commercially available computer, which is programmed in such a way that all aforementioned methods and the refinements thereof can be executed.

It is understood that the aforementioned features of the invention and the features of the invention yet to be explained below can be used not only in the described combinations, but also in other combinations or on their own, without departing from the scope of the present invention.

In the following text, the invention will be explained and described in more detail on the basis of a few selected exemplary embodiments and on the basis of the drawings.

DESCRIPTION OF DRAWINGS

In detail.

DETAILED DESCRIPTION

Figure 1:
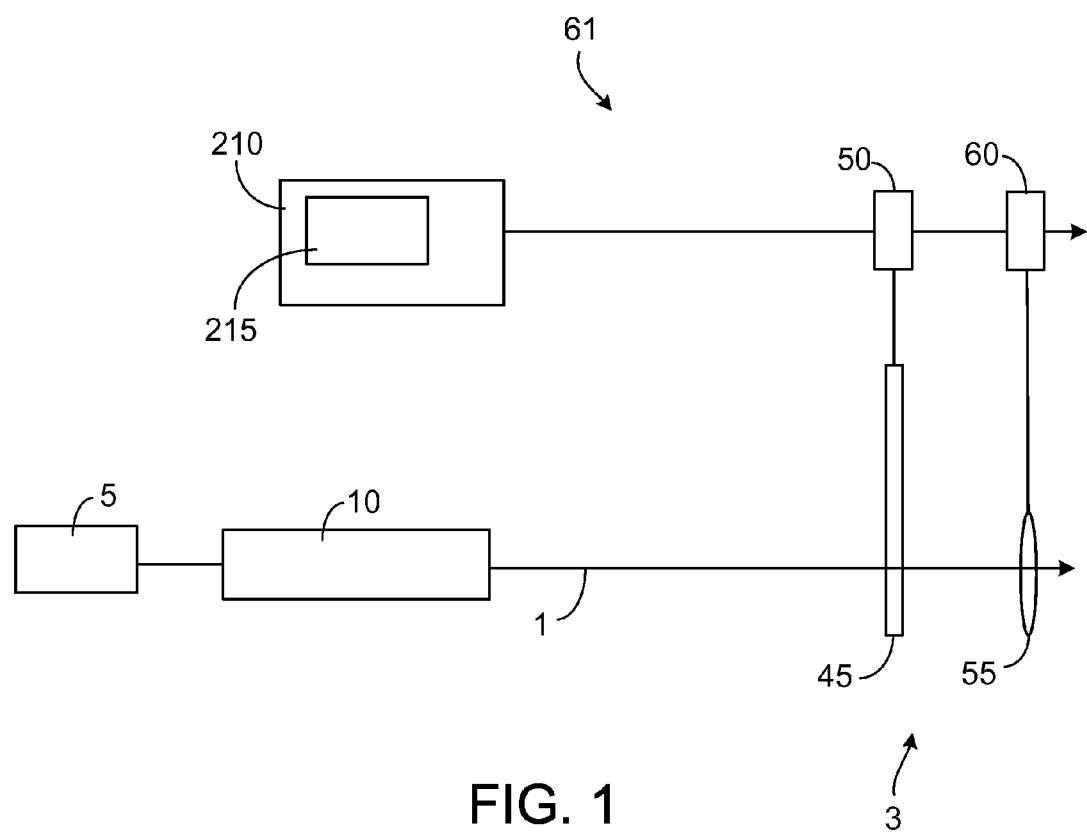
FIG. 1 shows a longitudinal section of a section of an illumination beam path of a microscope according to the invention.

As illustrated in FIG. 1, a microscope, embodied as a mask inspection microscope, according to a first exemplary embodiment consists of a radiation source 5—an excimer laser which emits illumination radiation with a wavelength of 193 nm. Along the optical axis 1, this is followed by a homogenizer 10 for homogenizing the intensity distribution of the illumination radiation in the pupil plane and for the depolarization thereof.

This is now followed by the stop plate 45, which is arranged in a pupil plane of the illumination beam path 3. These serve to predetermine the desired illumination angle or angles. The control is brought about via drive 50, which enables precise positioning of the stops 51.

Figure 2:
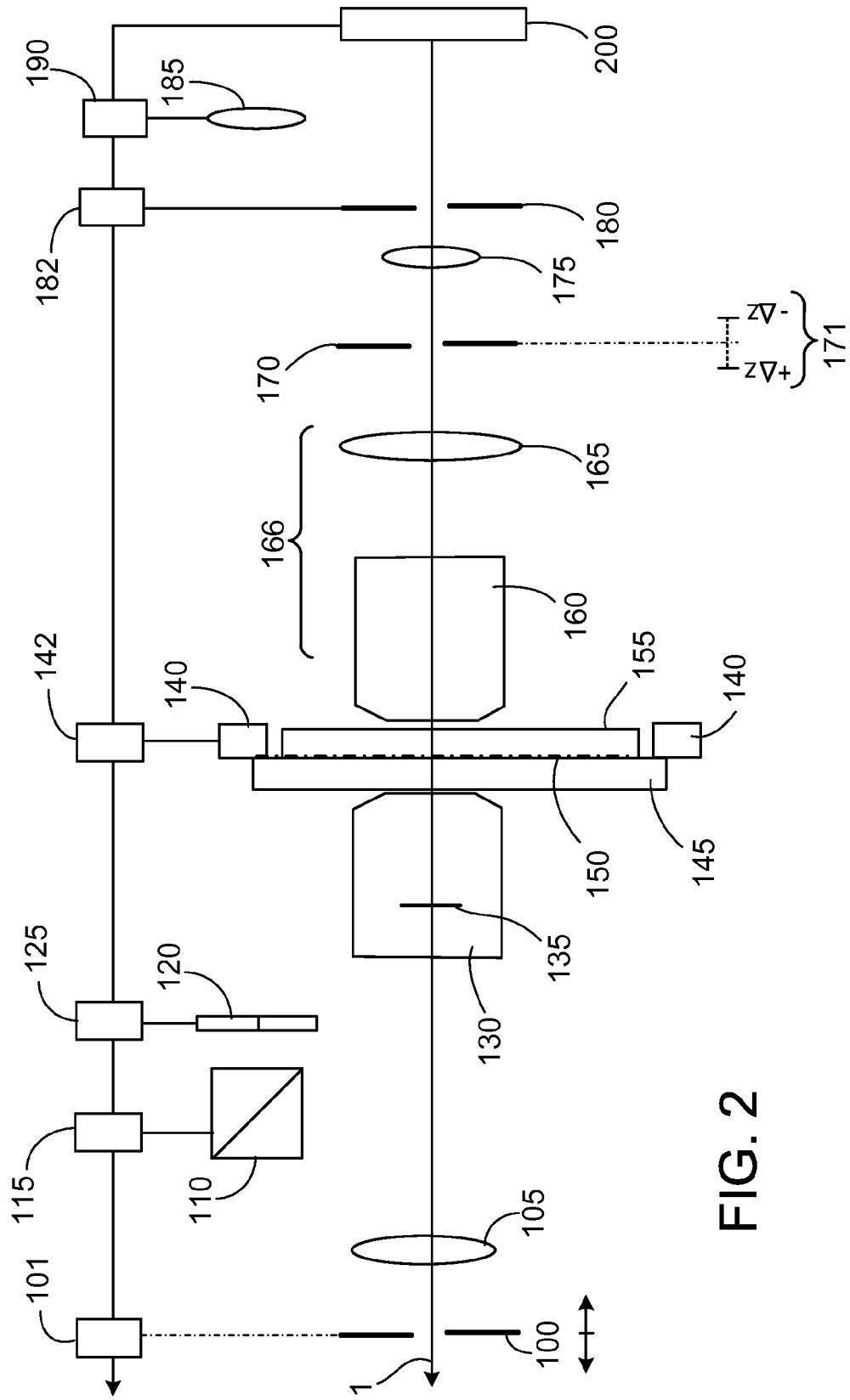
FIG. 2 shows a longitudinal section of a section of an illumination beam path and an imaging beam path of a microscope according to the invention.
Figure 4:
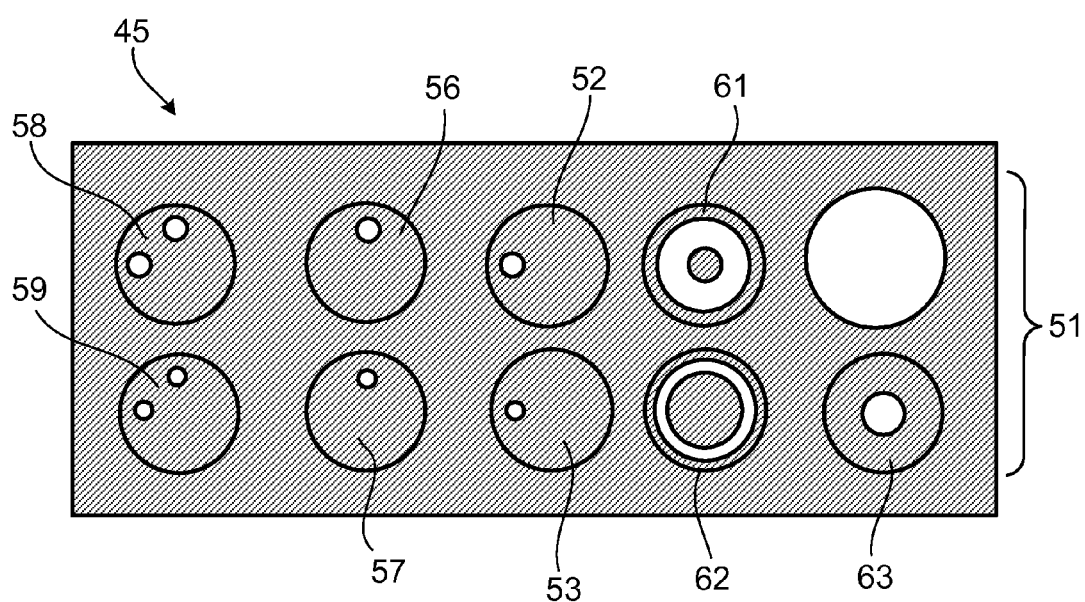
FIG. 4 shows a plan view of a stop plate with different stops.

As illustrated in FIG. 2, the set stop of the stops 51 is imaged in the desired size on the resultant pupil plane 135 of the condenser 130 by means of a zoom objective lens 55 with actuator 60. The linear magnification can be varied by a factor of 3. A stop plate is illustrated in FIG. 4; the regions that are opaque to the illumination radiation are shaded. If the stops are embodied as reflective stops, the shaded regions do not reflect illumination radiation. The stop plate 45 is connected to the drive 50 in an interchangeable fashion. The elements described above serve to provide illumination radiation with a predetermined illumination angle and are also referred to as illumination unit 61 in their totality.

The continuation of the illumination beam path 3 of the first exemplary embodiment is illustrated in FIG. 2. It is followed by an illumination field stop 100 for predetermining the size and the intensity profile of the illumination field 240, which is sketched in FIG. 5, on the object 145. Object 145 is embodied as a mask 145. Stop 100 is imaged on the mask 145. A drive 101 serves for focusing or defocusing the image of the stop 100 on the mask.

The square opening of the illumination field stop 100 has an edge length of 340 µm. The center point of the illumination field stop 100 lies on the optical axis 1. The dimensions of the field stop result in an illumination field with an edge length of 26 µm when focusing on the mask. Provision is made for the use of illumination field stops with different sizes. In a further variant (not illustrated in the figures), no illumination field stop 100 is used.

Figure 5:
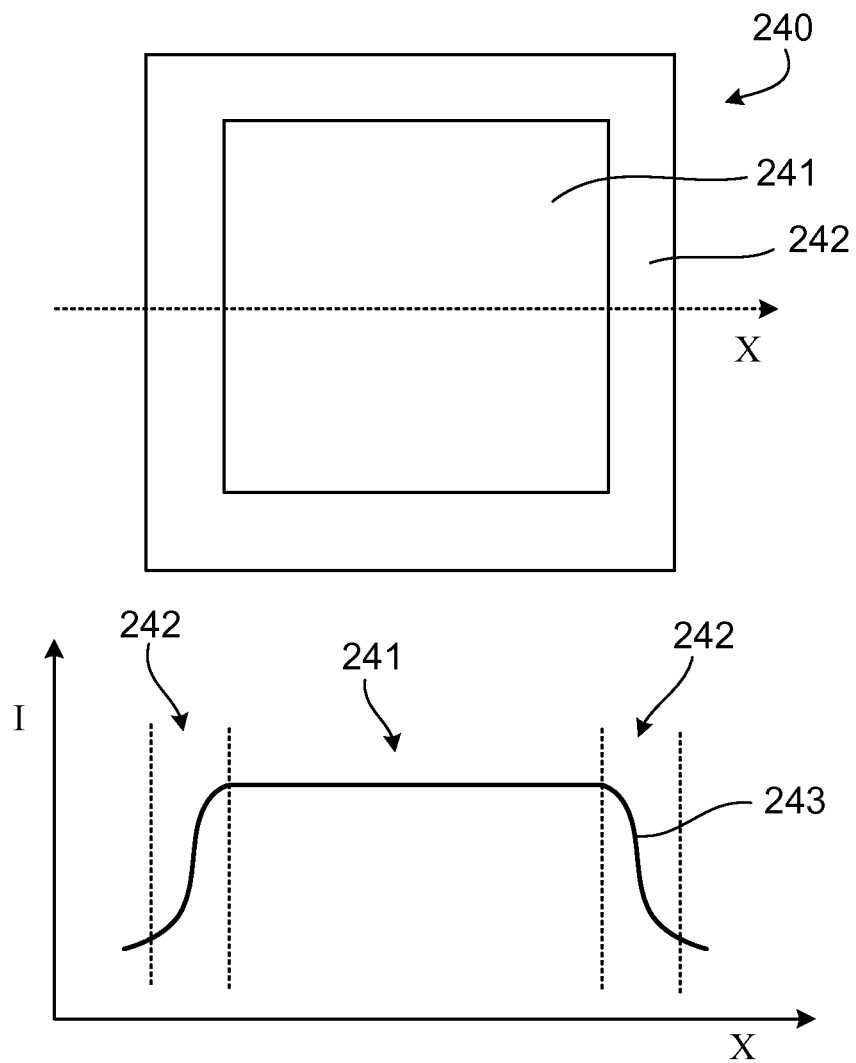
FIG. 5 shows an intensity profile of an illumination field.

An example of an adjustable illumination field 240 is sketched in FIG. 5. The intensity profile of the illumination radiation within the square illumination field 240 is constant within a square main region 241. The main region 241 is smaller than the whole illumination field 240 and is surrounded by an edge region 242 with a constant width. Within the edge region, the intensity of the illumination radiation reduces continuously toward the edge of the illumination field. The reduction in intensity can be described by the shape of a Gaussian curve. The intensity profile of the illumination field 240 is sketched as curve 243 along an axis denoted by X. The X-axis splits the illumination field 240 in two, parallel to two opposing outer edges.

The illumination field stop 100 is followed by a tube lens 105 and the condenser 130 with a pupil plane 135.

In order to polarize the illumination radiation, the polarizers 110 and 120 can be introduced into the illumination beam path 3 by the drives 115 and 125. Polarizer 110 polarizes the illumination radiation in a linear fashion; the direction of the polarization can be set by rotating the polarizer 110 using drive 115. In order to achieve tangential polarization of the illumination radiation, the polarizer 120, which is embodied as segmented polarization converter, is introduced into the illumination beam path 3 in addition to the polarizer 110. The linear polarization is rotated by this polarizer 120 in sectors, and so the result is an approximately tangential polarization. Three variants of the polarizer 120 are available (not illustrated in FIG. 2). A selection can be made between the subdivisions in 4, 8 or 12 sectors.

The mask 145 to be inspected, having the structure 150, is protected by a pellicle 155. The mask lies on the mask holder 140, which is moved laterally by drive 142 in a plane referred to as XY-plane in order to move the mask to the desired position such that the point to be inspected is situated in the illumination beam path 3. Drive 142 is also used to move the mask in the direction of the optical axis, the Z-axis, for focusing purposes. Through objective 160, via the tube lens 165, imaging field stop 170, magnification optical unit 175, the image of the mask is imaged on the detector 200, which is a CCD chip (charge coupled device). Objective 160 and tube lens 165 form the imaging unit 166. In one variant of the exemplary embodiment, the objective 160 is moved in the direction of the Z-axis instead of the mask 145 for the purpose of focusing the image. The numerical aperture is set by the NA-stop 180 with drive 182.

Imaging field stop 170 is arranged in the image plane of the mask 145, when the latter is focused. In other words, this means that the imaging field stop 170 is arranged in the image plane, which is also referred to as field plane, of the imaging unit 166. Alternatively, the imaging field stop 170 is defocused, i.e. arranged at a distance from the image plane in the direction of the optical axis 1. By way of example, the spacing can be 4 µm.

Illumination field stop 100 and imaging field stop 170 are preferably produced from light-opaque materials, for example metal, with appropriate openings. They can also be embodied as planar glass plates, wherein the region opaque to illumination radiation is produced by a chromium coating of the glass plate. The shape of the stops can be square, rectangular or else circular. The equations specified below for calculating the dimensions of stops with square openings then have to be adapted accordingly. The stops can also be embodied such that they are adjustable in terms of their size, for example by means of adjustable lamellae. In addition to the arrangement of the stops in a plane, it is also possible to generate an image of the stop in this plane, for example by means of a zoom objective as explained above in stop 51 of the stop plate 45.

In order to image the pupil plane of the illumination beam path 3 on the detector 200, a Bertrand lens 185 is introduced into the illumination beam path 3 by drive 190.

All drives 50, 60, 101, 115, 125, 142, 182, 190, 185 and the detector 200 are connected to data processing apparatus 210 with an input and output unit 215. The mask inspection microscope is controlled by this data processing apparatus 210. By reading the detector 200, the respective image is stored; the image data is further processed.

In a further exemplary embodiment (not illustrated in the drawings), the mask inspection microscope is operated in reflection. In this case, the mask 145 is illuminated from the side of the structure 150. That is to say, the mask lies on the mask holder 140 precisely with the opposite side. The radiation reflected on the structure 150 is decoupled from the illumination beam path 3 in a known fashion by a beam splitter and continues to extend, as illustrated in FIG. 2, until being imaged on a detector 200.

Figure 3:
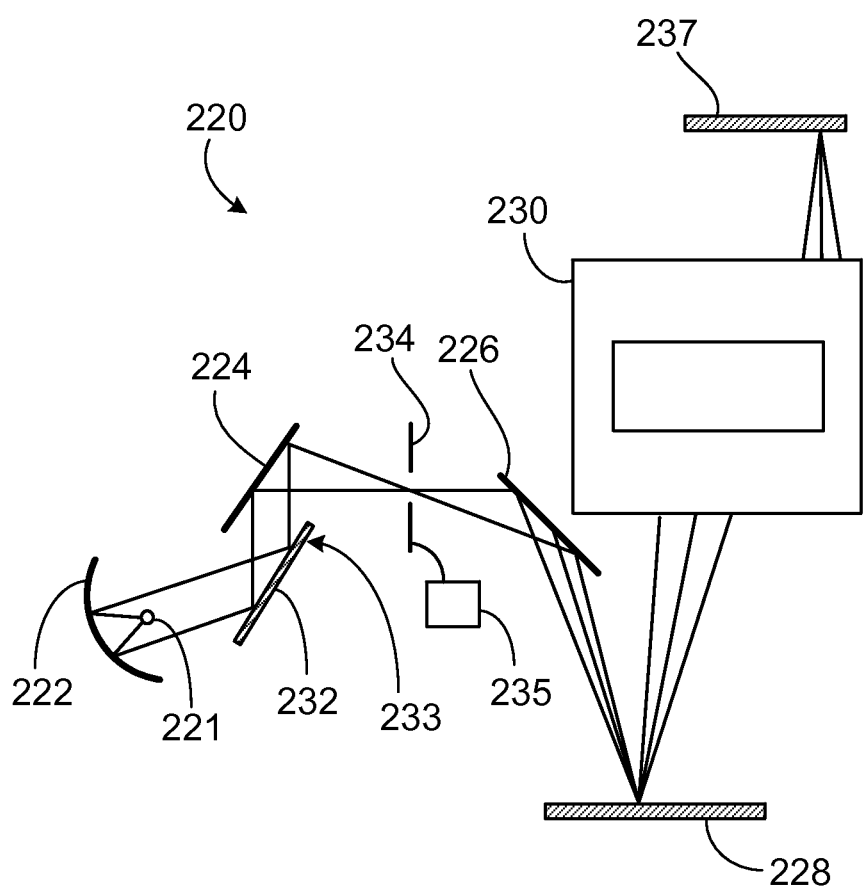
FIG. 3 shows a schematic illustration of a microscope according to the invention with illumination radiation, which operates in the EUV range.

In a further exemplary embodiment, the mask inspection microscope is operated with illumination radiation in the EUV range with a wavelength of 13.5 nm. The design is shown in FIG. 3. The radiation from an EUV radiation source 221 is collected by a collector 222 and reflected onto an EUV mask 228 to be examined by means of mirrors 224 and 226. An illumination field stop 234 serves to establish the size of the illumination field on the EUV mask 228. Stop 234 is imaged on the mask. A drive 235 serves for focusing or defocusing the image of the stop 234. Stops 232, which are arranged on a stop plate 233, are used to realize the desired illumination angles (analogously to, for example, the stops on the stop plates 45, 65). An image of the EUV mask is, via the imaging system 230, imaged on a detector 237 which, like drive 235 as well, is connected to a data processing apparatus (not illustrated) which reads out the detector and processes the image data further. A further mirror (not illustrated) is introduced into the imaging beam path for imaging the pupil plane on the detector 237.

Every point on the pupil plane corresponds to radiation at an angle from the object or image field planes. In the following text, angles, such as, for example, the illumination angle or diffraction angle, are specified as corresponding points on the pupil plane. The points are specified in polar coordinates, wherein the pole is the center point of the pupil. The radial coordinates are specified in units of the numerical aperture. The polar axis lies on an X-axis, wherein the positive direction in the illumination direction is defined to the right. The X-axis and the orthogonal Y-axis intersect the center point of the pupil plane. The azimuth angle is the angle between the radius and the X-axis. In the following text, illumination angles in the Z-direction are also specified as angle $\Theta$ to the optical axis 1; the azimuth angle is not defined by this specification.

A diffraction image is recorded as follows: the mask 145 with the structure 150 to be examined is introduced into the mask inspection microscope on the mask holder 140. By means of the drive 142, the desired section of the structure 150 is introduced into the beam path of the mask inspection microscope under control of the data processing apparatus 210. The Bertrand lens 185 is situated in the beam path. The drive 50 of the stop plate is used to set the desired illumination angles or the desired illumination angle by selecting a stop 51 on the stop plate 45.

The illumination field on the mask is set by the illumination field stop 100. In a first exemplary embodiment, the illumination field stop 100 is focused on the plane of the mask 145 by drive 101. The size of the illumination field stop 100 corresponds to the image field, which is imaged on the detector 200 by the imaging unit 166. In a further exemplary embodiment, the intensity profile of the illumination field is modified by virtue of defocusing the image of the illumination field stop 100 on the mask 145. In a further exemplary embodiment, use is made of an illumination field stop 100, which is larger than the image field on the detector 200. In a further exemplary embodiment, the illumination field stop 100 is removed from the beam path.

The diffraction image of the structure 150 is imaged on the detector 200. Focusing this image is brought about by moving the mask holder 140, using drive 142, in the direction of the optical axis, i.e. in the Z-direction. It is sufficient for the accuracy of the focusing to lie approximately in a region of $\Delta z=3$ µm to approximately 8 µm. The data processing apparatus 210 is used to read out the detector 200, which is embodied as a CCD chip (charge coupled device), and store a digital grayscale image. The method with a mask inspection microscope which operates using illumination radiation in the EUV-range with a wavelength of 13.5 nm is carried out in an analogous fashion.

In one variant of the exemplary embodiment, there is continuous relative movement between mask and detector while the diffraction image is recorded. This is achieved by the corresponding movement of the mask holder 140 by means of drive 142. The movement takes place in a direction perpendicular to the optical axis 1.

The mask is moved in such a way that the whole region of the mask to be characterized is scanned. The detector 200 is used to record a single diffraction image which is averaged over the whole surface to be characterized.

The speed of the motion of the mask and the exposure time of the detector 200 should be selected in such a way that the whole region to be examined will be moved uniformly through the beam path during the exposure time, i.e. that the region is scanned.

By way of example, the mask is moved line by line. The characterization is started at one corner of the region, the movement taking place parallel to a first outer edge of the region to be characterized. As soon as the end of this first outer edge is reached, i.e. as soon as the first line was scanned, the distance from the first outer edge is increased and the movement is continued in the opposite direction such that the next line is scanned.

The region to be characterized is the whole structured region of the mask or a freely definable contiguous portion.

The data processing apparatus 210 controls the scanner movement and evaluates the diffraction images.

The illumination angle or angles and the degree of coherence of the illumination radiation are set by the stop 51, 232 in the pupil plane of the mask inspection microscope and by the zoom objective 55.

The angle of the illumination radiation with respect to the optical axis 1, the Z-axis, is adapted to the grating period of the structure to be examined in such a way that the zero and the first (or minus first) order of diffraction are completely contained and resolved in the recorded diffraction image. The illumination angle can also be set in such a way that higher adjacent orders of diffraction, for example the first and the second order of diffraction, are imaged in the pupil.

The maximum illumination angle in the Z-direction is, for the purposes of recording the zero and first order of diffraction, restricted by the mask-side numerical aperture $NA_{Maske}$ of the objective. The angle (distance in the pupil plane) between the maxima of the zero and first orders of diffraction emerges from the wavelength of the illumination radiation and the grating period p as λ/p. An examination is only possible if λ/p<2NA$_{Maske}$. So that the first (or minus first) order of diffraction comes to rest in the pupil, the absolute value of the illumination angle in the Z-direction must be less than [λ/p−NA$_{Maske}$]. In order to achieve a symmetric arrangement of the maxima of the zero and first order of diffraction with respect to the center point of the pupil plane, a value of the illumination angle in the Z direction of λ/(2p) emerges.

In a first exemplary embodiment, use is made of annular, i.e. ring-shaped, distributions of illumination angles. Here, the illumination angle with respect to the Z-axis is predetermined as mentioned above; the azimuth angle is left undefined. Hence, comparable structures are captured on the mask, independently of the alignment thereof. Examples of stops for realizations are provided in FIG. 4. A first annular stop 61 has a wide ring; a second annular stop 62 has a narrower ring.

Provision is made for further optimized distributions of illumination angles for different structures. Different structures are usually present on a mask. The measurement of the line width of structures which, as already mentioned previously, are referred to as X- and Y-structures is particularly suitable for quality control.

For examining X-structures, provision is made for a distribution of illumination angles with one pole, which is situated on the X-axis. The azimuth angle of the illumination angle then is 0° or 180°. Corresponding stops (X-monopoles) are illustrated on the stop plate 45 in FIG. 4, denoted by reference signs 52 and 53. The degree of coherence of the first X-monopole 52 is greater than the degree of coherence of the second X-monopole 53.

For examining Y-structures, provision is made for a distribution of illumination angles with one pole, which is situated on the Y-axis. The azimuth angle of the illumination angle then is 90° or 270°. Corresponding stops (Y-monopoles) are illustrated on the stop plate 45 in FIG. 4, denoted by reference signs 56 and 57. The degree of coherence of the first Y-monopole 56 is greater than the degree of coherence of the second Y-monopole 57.

In order to examine X-structures and Y-structures simultaneously, provision is made for a distribution of illumination angles with two poles, which is referred to here as asymmetric XY-dipole. One pole is situated on the X-axis; one pole is situated on the Y-axis. By way of example, such illumination angles are achieved by stops in which one pole lies on the Y-axis and one pole lies on the X-axis. Examples are shown in FIG. 4, denoted by reference signs 58 and 59.

In a further exemplary embodiment, a distribution of illumination angles is used in which a pole lies in the center of the pupil, i.e. the illumination is performed along the optical axis 1. This is advantageous if the zero, first and minus first orders of diffraction of the illumination radiation diffracted on the structure are contained in the recorded diffraction image. For more precise evaluation of the diffraction image, the intensities of the first and minus first order of diffraction are compared to one another or the mean value thereof is formed.

In a further exemplary embodiment, provision is made for a mask inspection microscope, in which the dimensions of the illumination field stop 100 and of the imaging field stop 170 are adapted to the defocus region 171 and an asymmetric illumination angle Θ. The defocus region 171 extends along the optical axis by the distance +Δz to −Δz from the image plane of the imaging unit 166 or, synonymously, by the corresponding distance from the mask plane.

As already discussed previously, an asymmetric illumination angle Θ can be used in the characterization of a mask, which illumination angle is adapted to the structures of the mask. In the case of defocusing, there is a lateral displacement of the aerial image generated by the imaging unit 166 in a field plane. In the following text, the dimensions of the field stops and of the defocus region 171 from +Δz to −Δz are considered on the mask, i.e. in the mask plane. However, these dimensions can be converted into the respectively desired planes by means of the linear magnifications of the illumination or imaging optical unit of the mask inspection microscope.

The lateral displacement S during a defocusing Δz of the aerial image is given by Equation 1:

$$S = \tan(\Theta) * |\Delta z| \qquad 1$$

The direction of the defocusing starting from the image plane sets the direction of maximal displacement. The maximum lateral displacement in the direction of the radius of the azimuth angle is 2S.

The edge length of the square opening of the illumination field stop is referred to as F_bel. The edge length of the square opening of the imaging field stop is referred to as F_abb.

The linear magnification of the illumination field stop on the mask is referred to as M_bel, the linear magnification of the mask on the imaging field stop is referred to as M_abb.

F_bel_mask and F_abb_mask denote the edge lengths F_bel and F_abb of the respective stops in the mask plane.

The size of the illumination field stop on the mask is given by Equation 2:

$$F\_bel\_mask = F\_bel/M\_bel \qquad 2$$

The size of the imaging field stop on the mask is given by Equation 3:

$$F\_abb\_mask = F\_abb/M\_abb \qquad 3$$

In a first preferred variant, the illumination field stop 100, i.e. F_bel, is so large compared to the imaging field stop 170, i.e. F_abb, that the aerial image within the defocus region 171 is always cut off circumferentially by the imaging field stop 170 with the edge length F_abb. The dimensions of the illumination field stop 100 F_bel is given by Equation 4:

$$F\_bel\_mask >= F\_abb\_mask + 2S \qquad 4$$

The center point of the illumination field stop 100 furthermore lies on the optical axis 1. Hence, in the case of an illumination angle Θ, the field stop can be used for all azimuth angles. In one variant, provision is also made for asymmetric stops, which are only provided for one azimuth angle or only for a range of azimuth angles.

Using Equations 1 and 2, it is possible to calculate the sizes of the field stops, as shown in Equation 5 in exemplary fashion.

$$F\_bel >= (F\_abb/M\_abb + 2*S)*M\_bel \qquad 5$$

Depending on the structure of a mask, a further condition for the size of the imaging field stop 170, i.e. F_abb, may be advantageous. On masks there often are regions of a specific structure type, for example lines and spaces with a specific period or contact holes with a specific edge length, which are arranged periodically. For a precise measurement, it is now advantageous if only one structure type is taken into account when recording a diffraction image. To this end, corresponding sections of the mask are selected when recording diffraction images. The dimensions of the field stops are to be set in such a way that, even in the case of a lateral displacement of the aerial image within the defocus region 171, only the selected structure type lies within the imaging field stop 170.

If the region of a structure type is a square with an edge length S_mask, the dimensions of the imaging field stop are given by Equation 6:

$$F\_bel\_mask <= S\_mask \qquad (6)$$

$$F\_abb\_mask <= S\_mask - 2*S \qquad (7)$$

In a second variant, the illumination field stop 100, i.e. F_bel, is so small compared to the imaging field stop 170, i.e. F_abb, that the aerial image within the defocus region 171 always lies within the imaging field stop 170 with an edge length F_abb. The dimensions of the illumination field stop 100 F_bel are given by Equation 8:

$$F\_bel\_mask <= F\_abb\_mask - 2S \qquad (8)$$

Using Equations 1 and 2, it is possible to calculate the sizes of the field stops, as shown in Equation 9 in exemplary fashion.

$$F\_bel <= (F\_abb/M\_abb - 2*S)*M\_bel \qquad (9)$$

For a region of a structure type with an edge length S_mask, the dimensions of the imaging and illumination field stops are given by Equations 10 and 11.

$$F\_bel\_mask <= S\_mask - 2*S \qquad (10)$$

$$F\_abb\_mask <= S\_mask \qquad (11)$$

In the case of circular openings of the stops, the values of the aforementioned edge lengths correspond to the respective diameters.

As already mentioned previously, recorded diffraction images are available as digital grayscale images in the storage of the data processing apparatus 210. This is a matrix of 1000*1000 pixels with intensity values in a range from 0 to 255. In order to establish the intensities of the diffraction maxima, the position thereof within the diffraction image must be identified in a first step.

To the extent that the intended value of the grating period is known, the intended positions of the diffraction maxima to be evaluated of the zero and first (or minus first) orders of diffraction of the respective structures can be calculated in the recorded diffraction image from said grating period and the predetermined illumination angles. These calculations and the further evaluations are undertaken in the data processing apparatus 210.

Starting from these intended positions, the intensities of the diffraction maxima are established. To this end, all intensity values of the pixels of the diffraction image are added within a region about the intended position of a diffraction maximum. In one exemplary embodiment, the extent of the region of a diffraction maximum is identified by a limit value for the intensity values. Thus, only intensity values are considered which have at least 10% of the maximum intensity value within the diffraction maximum.

In a further exemplary embodiment, the position and the region for each diffraction maxima is fixedly predetermined.

The intensities of the first-order, denoted by $I_1$, and of the zero-order, denoted by $I_0$, diffraction maximum are used to calculate the ratio $I_1/I_0$, which is referred to as intensity ratio. In a variant of the method, it is also possible to calculate the reciprocal value.

In a further exemplary embodiment, the intensities to be measured of the orders of diffraction are normalized (clear normalization). A region of the mask which contains no structure is brought into the imaging beam path of the mask inspection microscope. The diffraction image recorded thus only contains an image of the pole or of the poles of the utilized stops. The intensities of these poles, referred to as clear intensities $I_{clear}$, are established as described above. Intensities measured from diffraction images are divided by the clear intensities for normalization purposes. The clear intensities for the zero and first order of diffraction are: $I_{0clear} = I_0/I_{clear}$; $I_{1clear} = I_1/I_{clear}$. The clear-normalized intensity values of the diffraction maxima are calculated in order, for example, to compare the intensity values of the diffraction maximum from different diffraction images to one another.

In one exemplary embodiment, a suitable stop is selected for calibrating one or more structures of a mask, whose grating periods and line widths are known, and the intensity quotient is established.

If the grating period is constant, the intensity ratio is, to a good approximation, only dependent on the line width. This calibration renders it possible to establish the absolute values of the line widths from measurements of the intensity ratios.

The calibration can take place against absolute measurements on the structure on the mask or on the wafer. In order to measure the absolute dimensions of the line width, both on the mask and on the wafer, use is made of a scanning electron microscope. Since only a small deviations of the line width (i.e. of the CD, the critical dimension) from the intended value is to be expected in the masks to be examined, a linear relationship can, to a good approximation, be assumed between the change in the intensity ratios and the line width.

An intended value of the critical dimension is usually known for a mask to be examined. In order to evaluate the intensity ratios, it can be assumed that this critical dimension approximately corresponds to the mean value of the intensity ratios of comparable structures. The relative deviation of the intensity ratios from the mean value then corresponds to the relative deviation from the predetermined critical dimension.

In order to characterize a mask, a stop corresponding to the desired distribution of illumination angles is selected—X-monopole, Y-monopole, asymmetric XY dipole or annular—which is adapted to the grating period of the structure to be examined.

To the extent that positions of regions with comparable structures are known on a mask, diffraction images are recorded at these positions in a targeted fashion. The respective intensity ratios are calculated directly for all images. By way of example, the positions of comparable structures can be established from the mask design, i.e. the information in respect of the structure which is produced on the mask.

If the mask design, i.e. the structure which is produced on the mask, is known, it is also possible to simulate the diffraction images of the measured positions. For evaluation purposes, the intensity ratios of the measured intensities are compared to those of the simulated intensities. The percentage deviations are, as specified above, illustrated graphically.

In a further measure, for example if the mask design is not predetermined, positions distributed uniformly over the mask are fixed for the measurement.

Diffraction images of comparable structures are sought in all recorded diffraction images. A criterion is the position of the first diffraction maximum, i.e. the spacing thereof from the zero-order diffraction maximum and the azimuth angle thereof. By way of example, diffraction maxima of X-structures are situated on the X-axis. A further criterion relates to the clear-normalized intensities of the diffraction maxima. A further criterion is the extent of the diffraction maxima. A further criterion is the difference from diffraction images simulated from the mask design. These criteria can be applied individually or in combination.

First of all, the clear-normalized intensities of the zero-order and of all further diffraction maxima of the diffraction images, and the distances thereof from the zero order of diffraction, are established from all diffraction images. Diffraction images with diffraction maxima of comparable distances are combined in groups. A tolerance range of the distances within one group is predetermined. As a further criterion, a check is carried out as to whether the clear-normalized intensity values of the respective order of diffraction from different diffraction images lie within a predetermined tolerance range. Diffraction images with intensity values outside of the tolerance range are not used to characterize the mask. An analogous approach is taken in respect of the spatial extent of the diffraction maxima. Diffraction images with diffraction maxima whose extent does not lie within a tolerance range are not used for the evaluation.

The intensity ratios are now calculated for each group of diffraction images, as explained above.

The mean value of all intensity values and the percentage deviation of all values from this mean value are calculated for evaluation purposes. Different colors or color hues are associated with different percentage deviations. The measured values are then illustrated by the respective color in a two-dimensional diagram of the mask. To the extent that the intensity ratios have been calibrated against known CD values, as mentioned above, it is possible to specify the absolute CD values in the two-dimensional diagram.

A further exemplary embodiment is used in the case of masks which have a number of regions with identical structures, so-called dies. In order to increase the accuracy, the average of the intensity ratios of identical positions of all dies is measured. For the evaluation, the percentage deviation of the individual intensity ratios from the average value over all dies is then specified for every position.

Figure 6:
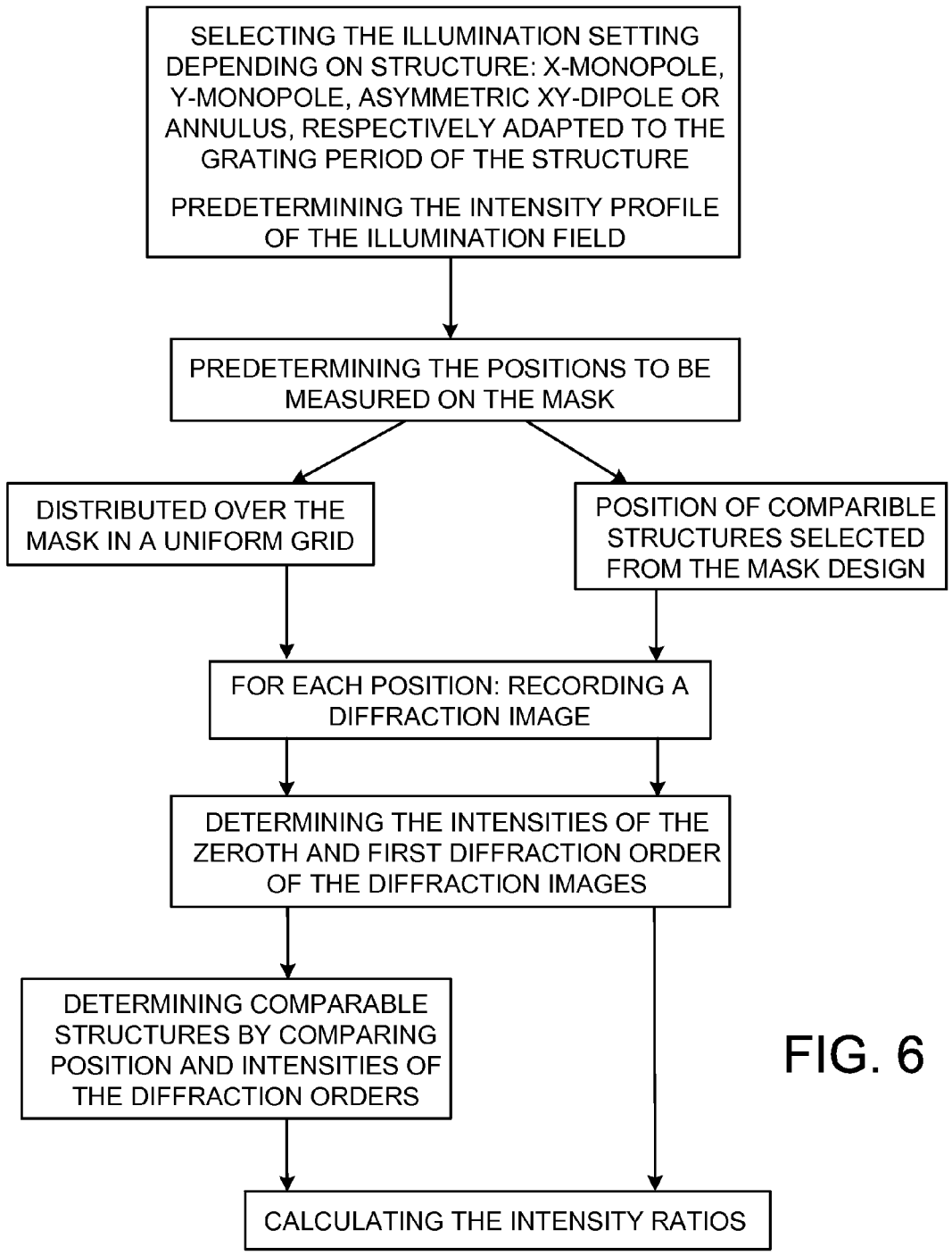
FIG. 6 shows a plan of the procedure of an example of the method according to the invention.

An overview of the method according to the invention is provided in FIG. 6.

What is claimed is:

1. A microscope comprising:
    an illumination unit for illuminating an object at a predetermined non-axial illumination angle ($\Theta$), in which the illumination angle is determined by a stop that is arranged in a pupil plane of an illumination beam path;
    an imaging unit for imaging an aerial image of the object in a plane within a predetermined defocus region extending in the direction of the optical axis of the microscope;
    an imaging field stop that is arranged in an image plane of the imaging unit; and
    a detector to detect the aerial image;
    wherein, as a result of the lateral displacement of the aerial image, depending on the position of the aerial image within the defocus region and on the non-axial illumination angle, the opening of the imaging field stop is dimensioned such that the aerial image is either completely encompassed or circumferentially cut within the defocus region.

2. The microscope according to claim 1, comprising an illumination field stop predetermining the size and intensity of an illumination field on the object.

3. The microscope according to claim 2, wherein the illumination field stop and the imaging field stop have a square design, wherein the following applies to the difference in an edge length of the imaging field stop F_abb_mask and the edge length of the illumination field stop F_bel_mask:
    |F_abb —mask|>=2*tan($\Theta$),
    wherein the measurements are related to the dimensions of these stops on the object.

4. The microscope according to claim 2, wherein the illumination field on the object has a main region and an edge region, wherein the edge region surrounds the main region, wherein the intensity of the illumination radiation is constant within the main region and continuously decreases in the edge region.

5. The microscope according to claim 1, wherein the measurements of an illumination field stop and of the imaging field stop are designed in such a way that an aerial image of an object within the defocus region only comprises one structure type.

6. The microscope according to claim 1, comprising:
    a Bertrand optical unit,
    wherein the Bertrand optical unit is inserted into the beam path of the microscope for recording a diffraction image of the object.

7. The microscope according to claim 1, comprising an illumination field stop (100) predetermining a size and intensity of an illumination field on the object, wherein a reduction in the intensity in an edge region corresponds to a Gaussian function.

8. The microscope according to claim 1, comprising an illumination field stop (100) predetermining a size and intensity of an illumination field on the object, wherein an intensity profile of the illumination field is adapted by defocusing the illumination field stop.

9. The microscope according to claim 1, wherein the stop comprises a monopole, and the position of the pole is adapted to the alignment of a grating period of a structure on the mask.

10. The microscope according to claim 1, wherein the stop comprises an asymmetric dipole, and the positions of the two poles of the dipole are adapted to the alignments of grating periods of different structures on the mask.

11. A method for characterizing a mask having a structure, the method comprising:
    illuminating the mask at at least one predetermined non-axial illumination angle using illumination radiation such that an aerial image of the structure is created in a plane within a predetermined defocus region which extends in the direction of the beam path of the microscope, in which the illumination angle is determined by a stop that is arranged in a pupil plane of the beam path;
    predetermining an imaging field stop that is arranged in an image plane of the imaging unit, wherein the opening of the imaging field stop is dimensioned such that the aerial image is either completely encompassed or circumferentially cut; and
    detecting the aerial image.

12. The method according to claim 11, wherein the illumination radiation on the mask generates an illumination field and a diffraction image of the structure is created, said diffraction image comprising at least two maxima of adjacent orders of diffraction.

13. A method for characterizing a mask having a structure, the method comprising:
    illuminating the mask at at least one illumination angle using monochromatic illumination radiation such that a diffraction image of the structure is created, said diffraction image comprising at least two maxima of adjacent orders of diffraction, in which the illumination angle is determined by a stop that is arranged in a pupil plane of an illumination beam path;
    imaging, using an imaging unit, the diffraction image of the structure in a plane within a predetermined defocus region extending in the direction of the optical axis of the microscope;
    configuring a dimension of an opening of an imaging field stop that is arranged in an image plane of the imaging unit such that, as a result of the lateral displacement of the diffraction image, depending on the position of the diffraction image within the defocus region and on the illumination angle, the diffraction image is either completely encompassed or circumferentially cut within the defocus region;

recording the diffraction image;

establishing the intensities of the maxima of the adjacent orders of diffraction; and establishing an intensity ratio of the intensities.

14. The method according to claim 13, wherein the diffraction image is completely imaged on a single detector for recording purposes.

15. The method according to claim 13, comprising:

establishing a line width of the structure from at least one correlation between at least one established intensity ratio of a structure and a known line width of this structure.

16. The method according to claim 13, wherein the illumination radiation generates an illumination field on the mask, said illumination field having a main region and an edge region, wherein the edge region surrounds the main region, wherein the intensity of the illumination radiation is constant within the main region and continuously decreases in the edge region.

17. A microscope having a data processing apparatus programmed to execute the steps as per the method of claim 11.

18. A microscope having a data processing apparatus programmed to execute the steps as per the method of claim 13.

* * * * *

UNITED STATES PATENT AND TRADEMARK OFFICE
CERTIFICATE OF CORRECTION

PATENT NO. : 9,268,124 B2  Page 1 of 1
APPLICATION NO. : 13/908192
DATED : February 23, 2016
INVENTOR(S) : Seitz et al.

It is certified that error appears in the above-identified patent and that said Letters Patent is hereby corrected as shown below:

In the Drawings

Line 10 of FIG. 6, delete "POSITION OF COMPARIBLE" and insert -- POSITION OF COMPARABLE --

In the Claims

Column 17
Line 61, in claim 3, delete "F _bel _mask:" and insert -- F_bel_mask: --
Line 62, in claim 3, delete "|F_abb – mask| >= 2*tan(Θ)," and insert
-- |F_abb_mask – F_bel_mask| >= 2*tan(Θ), --

Signed and Sealed this
Twenty-first Day of June, 2016

Michelle K. Lee
*Director of the United States Patent and Trademark Office*